US008346906B2

(12) United States Patent
Shaffer et al.

(10) Patent No.: US 8,346,906 B2
(45) Date of Patent: Jan. 1, 2013

(54) SYSTEM AND METHOD FOR COMPUTER ORIGINATED AUDIO FILE TRANSMISSION

(75) Inventors: Shmuel Shaffer, Palo Alto, CA (US); Labhesh Patel, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 13/165,901

(22) Filed: Jun. 22, 2011

(65) Prior Publication Data

US 2011/0249671 A1    Oct. 13, 2011

Related U.S. Application Data

(63) Continuation of application No. 09/816,836, filed on Mar. 23, 2001, now Pat. No. 7,970,875.

(51) Int. Cl.
*G06F 15/16* (2006.01)
*H04L 12/16* (2006.01)

(52) U.S. Cl. ............... 709/223; 709/224; 370/259

(58) Field of Classification Search .................. None
See application file for complete search history.

(56) References Cited

U.S. PATENT DOCUMENTS

| | | | |
|---|---|---|---|
| 4,271,507 A | 6/1981 | Gable et al. | |
| 5,359,593 A | 10/1994 | Derby et al. | |
| 5,444,706 A | 8/1995 | Osaki | |
| 5,477,531 A | 12/1995 | McKee et al. | |
| 5,710,942 A | 1/1998 | Nakagaki et al. | |
| 5,918,020 A * | 6/1999 | Blackard et al. | 709/228 |
| 6,009,108 A | 12/1999 | Takehara et al. | |
| 6,011,590 A | 1/2000 | Saukkonen | |
| 6,011,776 A | 1/2000 | Berthaud et al. | |
| 6,115,357 A | 9/2000 | Packer et al. | |
| 6,230,255 B1 | 5/2001 | Asghar et al. | |
| 6,282,192 B1 | 8/2001 | Murphy et al. | |
| 6,292,834 B1 | 9/2001 | Ravi et al. | |
| 6,298,041 B1 | 10/2001 | Packer | |
| 6,377,931 B1 | 4/2002 | Shlomot | |
| 6,400,724 B1 | 6/2002 | Yao | |
| 6,405,257 B1 | 6/2002 | Gersht et al. | |
| 6,408,327 B1 | 6/2002 | McClennon et al. | |
| 6,434,606 B1 | 8/2002 | Borella et al. | |
| 6,466,550 B1 | 10/2002 | Foster et al. | |
| 6,512,761 B1 | 1/2003 | Schuster et al. | |

(Continued)

OTHER PUBLICATIONS

USPTO; Office Action for U.S. Appl. No. 09/815,782 (7 pages), Aug. 13, 2003.

(Continued)

*Primary Examiner* — Scott Christensen
(74) *Attorney, Agent, or Firm* — Baker Botts L.L.P.

(57) ABSTRACT

A system and method for computer originated audio file transmission includes a server having a communications module operable to communicate with a terminal unit. The server may also include a storage module operable to store at least one file. A processor may be provided to separate the file into a plurality of packets. In accordance with one embodiment of the present invention, the communications module is operable to send an initial burst of packets to the terminal unit, wherein the initial burst of packets includes at least two of the plurality of packets. In accordance with another embodiment of the present invention, the communications module is further operable to send additional packets of the plurality of packets at a predetermined rate, until each of the plurality of packets has been sent to the terminal unit.

21 Claims, 3 Drawing Sheets

U.S. PATENT DOCUMENTS

| | | | |
|---|---|---|---|
| 6,542,499 B1 | 4/2003 | Murphy et al. | |
| 6,570,849 B1 * | 5/2003 | Skemer et al. | 370/230.1 |
| 6,658,027 B1 | 12/2003 | Kramer et al. | |
| 6,700,895 B1 | 3/2004 | Kroll | |
| 6,721,280 B1 | 4/2004 | Mauro et al. | |
| 6,742,082 B1 | 5/2004 | Lango et al. | |
| 6,775,265 B1 | 8/2004 | Oran | |
| 6,961,346 B1 | 11/2005 | Michalewicz et al. | |
| 6,985,492 B1 | 1/2006 | Thi et al. | |
| 7,068,684 B1 | 6/2006 | Suder et al. | |
| 7,373,413 B1 | 5/2008 | Nguyen et al. | |
| 2001/0005372 A1 | 6/2001 | Cave et al. | |
| 2006/0133584 A1 | 6/2006 | Uranaka et al. | |
| 2007/0049247 A1 | 3/2007 | Espejo et al. | |
| 2007/0201628 A1 | 8/2007 | Geile et al. | |
| 2007/0253547 A1 | 11/2007 | Sanchez et al. | |

OTHER PUBLICATIONS

USPTO; Office Action for U.S. Appl. No. 09/815,782 (8 pages), Feb. 10, 2004.
USPTO; Office Action for U.S. Appl. No. 09/815,782 (4 pages), Mar. 11, 2004.
USPTO; Office Action for U.S. Appl. No. 09/815,782 (3 pages), Apr. 22, 2004.
USPTO; Office Action for U.S. Appl. No. 09/815,782 (3 pages), May 24, 2004.
USPTO; Office Action for U.S. Appl. No. 09/815,782 (3 pages), May 23, 2005.
USPTO; Office Action for U.S. Appl. No. 09/815,782 (3 pages), May 17, 2005.
USPTO; Office Action for U.S. Appl. No. 09/815,782 (11 pages), Aug. 8, 2005.
USPTO; Office Action for U.S. Appl. No. 09/815,782 (3 pages), Dec. 21, 2005.
USPTO; Office Action for U.S. Appl. No. 09/815,782 (13 pages), Jul. 29, 2009.
USPTO; Office Action for U.S. Appl. No. 09/815,782 (12 pages) Mar. 22, 2010.
USPTO; Office Action for U.S. Appl. No. 09/815,782 (15 pages), Dec. 8, 2010.
Co-pending United States patent application entitled "System and Method for Controlling Computer Originated Audio File Transmission" by S. Shaffer and L. Patel, Mar. 23, 2001.

* cited by examiner

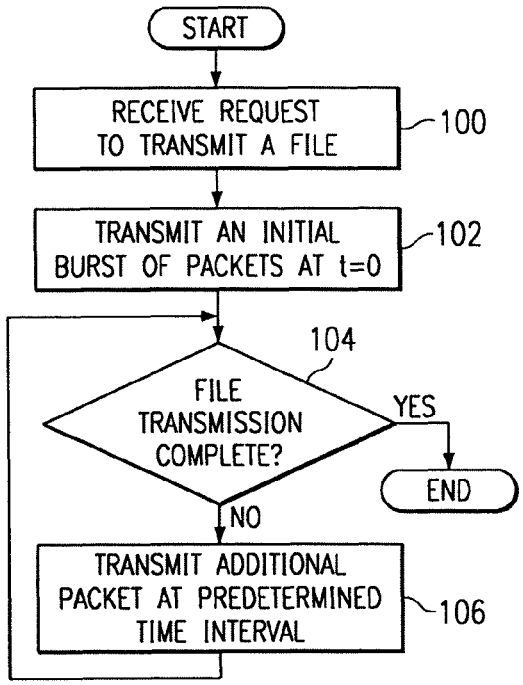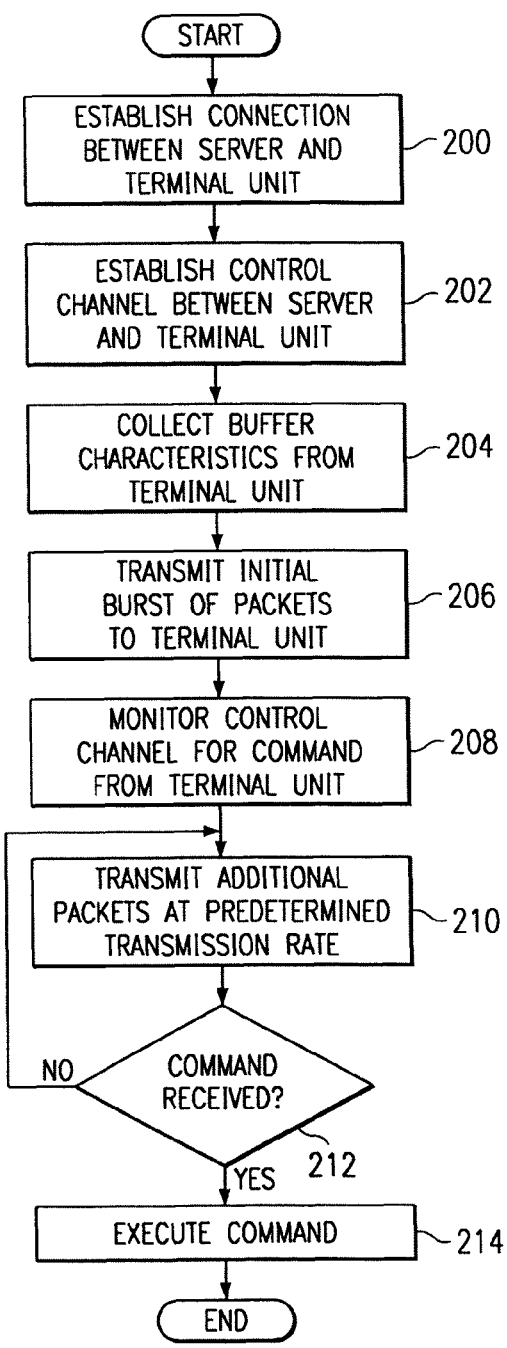

SYSTEM AND METHOD FOR COMPUTER ORIGINATED AUDIO FILE TRANSMISSION

RELATED APPLICATIONS

This application is a continuation of U.S. application Ser. No. 09/816,836 filed Mar. 23, 2001 and entitled "System and Method for Computer Originated Audio File Transmission."

This application is related to U.S. patent application Ser. No. 09/815,782 entitled System and Method for Controlling Computer Originated Audio File Transmission, and filed Mar. 23, 2001.

TECHNICAL FIELD OF THE INVENTION

The present invention relates generally to network communications, and more particularly, to a system and method for computer originated audio file transmission.

BACKGROUND OF THE INVENTION

Voice over Internet Protocol (VoIP) is the technology used to transmit voice conversations over a data network using the Internet Protocol (IP). Such data networks may include the Internet or a corporate intranet. In VoIP systems, analog voice is digitized, compressed, and sent as packets over IP networks. The digitized voice packets are sent over the IP network as they become available. In order to improve the perceived voice quality, the network terminal unit receiving the transmission may utilize a jitter buffer with a configurable or predetermined capacity. As the terminal unit receives the digitized voice packets, it fills up the jitter buffer. When the number of packets in the jitter buffer reaches a predetermined number, the terminal unit starts to play the sound to a user of the terminal unit. The jitter buffer causes a small delay in playback to the user, since the terminal unit will not begin playback until the jitter buffer receives the predetermined number of packets.

SUMMARY OF THE INVENTION

The present invention provides a system and method for computer originated audio file transmission that substantially reduce or eliminate the problems and disadvantages associated with the previous methods and systems. In particular, overall voice quality of a computer originated audio file is improved by transmitting an initial burst of packets to a jitter buffer associated with a terminal unit, to avoid delays in playback resulting from the jitter buffer waiting to receive a predetermined number of packets prior to playback. Therefore, voice degradation due to variable delays in the network and media transmission rate regarding non-real-time characteristics of the operating system are reduced or eliminated.

In accordance with a particular embodiment of the present invention, a server includes a communications module operable to communicate with a terminal unit. The server may also include a storage module operable to store at least one file. A processor may be included with the server, the processor being operable to separate the file into a plurality of packets.

In a particular embodiment, the communications module may be operable to send an initial burst of packets to the terminal unit, wherein the initial burst of packets includes at least two of the plurality of packets. More specifically, in accordance with another embodiment of the present invention, the communications module may be further operable to send additional packets of the plurality of packets at a predetermined rate, until each of the plurality of packets has been sent to the terminal unit. In accordance with yet another embodiment of the present invention, the communications module may be operable to communicate using VoIP.

In accordance with still another embodiment of the present invention, the communications module may be operable to receive information regarding the terminal unit. The information may include a capacity of a buffer associated with the terminal unit and/or the number of packets the buffer must receive before playback may begin.

A technical advantage of a particular embodiment of the present invention includes providing a system and method which reduce the time delay at the beginning of playback of a computer originated message, or file. By transmitting an initial burst of packets after a connection is established between the server and a terminal unit, a buffer associated with the terminal unit may begin playback immediately upon receiving the initial burst of packets. Also, voice degradation due to jitter buffer starvation is reduced and/or eliminated by loading the jitter buffer with numerous media packets, at the start of the transmission.

Another technical advantage of a particular embodiment of the present invention includes a system and method operable to determine the number of voice packets that can be included in the initial burst of packets. By limiting the number of packets to a number which the jitter buffer can handle, performance is enhanced without loss of packets due to a jitter buffer exceeding its capacity. In a particular embodiment, two network elements may "negotiate" the number of packets to be included in the initial burst based, at least in part, on the speed of the communication path between the elements, and the configuration of one or more of the elements.

Yet another technical advantage of a particular embodiment of the present invention includes a system and method for detecting when a network element interacts with a computerized media generating endpoint.

Still another technical advantage of a particular embodiment of the present invention includes a system and method which reduces or eliminates a sluggish response by providing a media generating network element which controls the jitter buffer of a receiving network element.

Still another technical advantage of a particular embodiment of the present invention includes a system and method which reduces or eliminates a sluggish response by providing a media generating network element which may flush the voice packets from the jitter buffer of the receiving network element.

Still another technical advantage of a particular embodiment of the present invention includes a system and method for server control of a client jitter buffer resulting in a distributed voice control system.

Still another technical advantage of a particular embodiment of the present invention includes a system and method having a mechanism for a network element to flush its jitter buffer when it detects a command-present event.

Still another technical advantage of a particular embodiment of the present invention includes a system and method operable to enhance file transmission between network elements, the system and method being backwards compatible with existing systems.

Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 7 is a flow diagram illustrating a method for transmitting a file from a server to a terminal unit, in accordance with still another embodiment of the present invention; and FIG. 8 is a flow diagram illustrating a method for transmitting a file from a server to a terminal unit and exercising control over a jitter buffer associated with the terminal unit, in accordance with still another embodiment of the present invention.

DETAILED DESCRIPTION OF THE INVENTION

Figure 1:
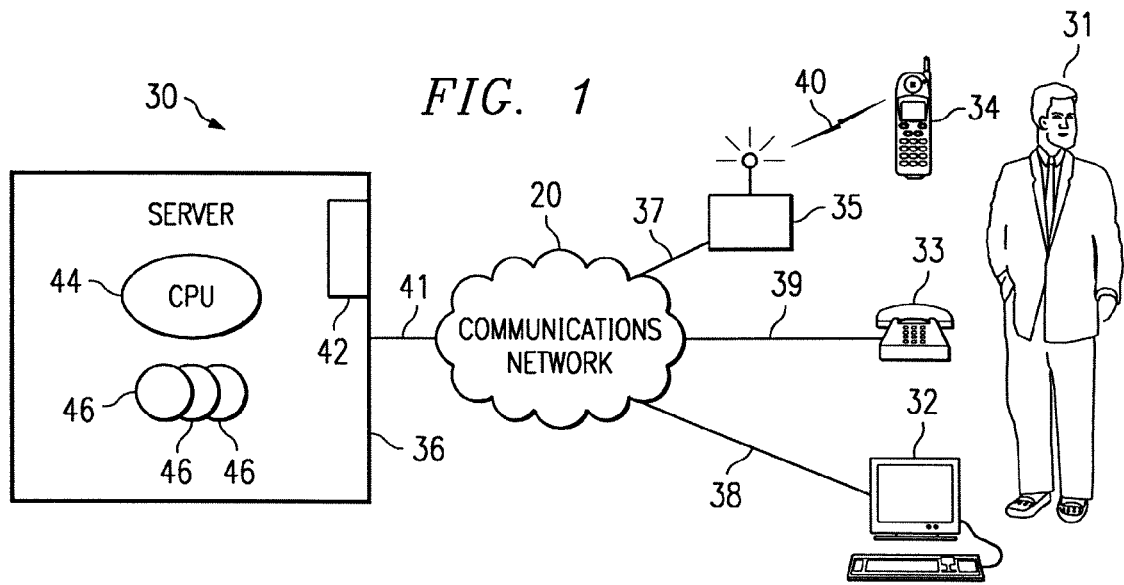
FIG. 1 is a block diagram illustrating a communication network including a plurality of terminal units and a server, in accordance with one embodiment of the present invention.

FIG. 1 illustrates a communications network 30 that includes a plurality of terminal units 32-34, coupled with a server 36, through a communications network 20. Information stored on server 36, including computer originated audio files, are available to users of terminal units 32-34, and accessible over communications network 30. The teachings of the present invention include a system and method for audio file transmission of enhanced speed, accuracy, and reliability, wherein server 36 sends an initial burst of packets of the audio file to a terminal unit, upon request, in order to rapidly fill a jitter buffer associated with the terminal unit, and minimize or reduce delay in playback.

Networks 20 and/or 30 may include a public or private network, the Internet, and/or the worldwide web (WWW). It will be understood from the following description that the present invention may be used in connection with other suitable computer and/or telecommunications networks, including but not limited to, intranets, local area networks (LANs), wide area networks (WANs) or metropolitan area networks (MANs). Accordingly, communications between and among server 36, terminal units 32-34, and other network elements associated with communications networks 20 and/or 30 may be accomplished according to the voice over internet protocol (VoIP), and/or related suite of protocols.

Terminal unit 32 of the illustrated embodiment is a desk top personal computer (PC), lap top, personal digital assistant (PDA) or other device coupled with communications network 30, through a communication link 38. Terminal unit 32 is Internet-enabled and includes a web browser for accessing the WWW through communications network 30.

Terminal unit 33 is a telephone extension coupled with communications network 30 through communication link 39. In particular embodiments, terminal unit 33 may include various analog, digital, or other wireline voice communication devices. Furthermore, terminal unit 33 may include a digital Internet telephone extension, including the ability to communicate using VoIP.

Terminal unit 34 of the illustrated embodiment is a wireless handset coupled with a transmitter 35 over wireless communication link 40. Communication link 37 couples transmitter 35 with network 30. Wireless handset 34 may be Internet-enabled and include the ability to receive, manipulate and display pages of the WWW. Handset 34 may also include the ability to communicate using VoIP technology. Accordingly, terminal units 32-34 may include telephones, personal computers, laptops, PDAs, or any other devices capable of wireless and/or wireline communication over a distributed network.

Server 36 may include any computer having the ability to communicate over network 30. Communication link 41 couples server 36 with network 30. In the illustrated embodiment of FIG. 1, server 36 includes a communications module 42 operable to establish a path of communication between server 36 and one or more of terminal units 32-34. A central processing unit (CPU) 44 may be provided to perform logic, computational and decision making functions, as well as interpret and execute instructions and control the operation of server 36. One or more databases 46 may also be provided to store data, files, and/or other information available to users of network 30. When a user 31 of a network element, for example terminal unit 33, desires to access server 36, a path of communication is established between communication module 42 and terminal unit 33. Accordingly, terminal unit 33 may be provided access to features, functionality and/or information available from server 36.

Server 36 of the illustrated embodiment is a unified messaging system. However, server 36 may include a separate component, or network element, or server 36 may be incorporated into one or more network components. For example, server 36 of the present invention may be integral to and incorporated with a terminal unit 32-34. Server 36 may also comprise an automated attendant (AA), an interactive voice response (IVR), and/or an automatic call distributor (ACD).

The teachings of the present invention will improve communication between terminal units 32-34 and any computerized media generating network element, for example server 36. Server 36 may include computer originated audio files, including messages (e.g. voicemail), prompts (e.g. menu alternatives), greetings and any other computer originated and/or computer generated audio messages. For the purposes of this specification, computer originated audio files include text to speech (TTS), synthesized voice and/or pre-recorded audio messages. Such files are typically available on server 36 for playback to user 31 of terminal unit 33 almost immediately upon the establishment of a path of communication, or communication connection between server 36 and terminal unit 33. In a particular embodiment, such files may include ".wav" files stored on a hard drive of the UMS.

Figure 2:
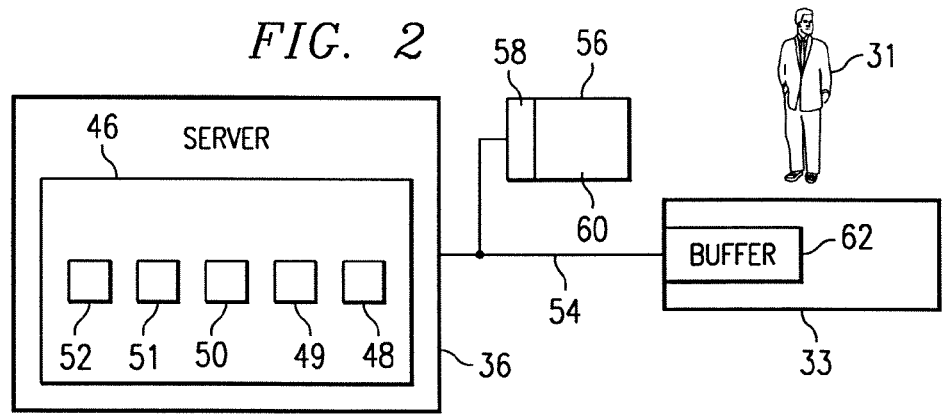
FIG. 2 is a block diagram illustrating a path of communication between the server and one of the terminal units of FIG. 1.

FIG. 2 is a block diagram illustrating a communication session between server 36 and terminal unit 33. In the illustrated embodiment, user 31 of terminal unit 33 establishes a VoIP connection with server 36 in order to access particular resources. In a particular embodiment, server 36 may be operable to retrieve data over the web, and accomplish text to speech to present the data to user 31 of server 36. As previously discussed, server 36 may also include information and/or files stored in one or more of databases 46. Databases may reside on hard drives, attached disk drives, random access memory and/or network attached storage devices (NAS) coupled with server 36. Such information may include a plurality of computer originated audio files 48-52. For the purposes of this specification, a computer originated audio file is a file which includes an audible audio message which may be played for a user of the network. For example, upon establishing a path of communication 54 between server 36 and terminal unit 33, server 36 may prompt an audio greeting file 48. Greeting file 48 welcomes user 31 and provides a menu of selections available to user 31. If user 31 selects an option allowing access to a mailbox, file 49 may be played with additional instructions on retrieving messages. In this manner, user 31 may navigate through menus and selections in order to accomplish tasks, and retrieve information. In the illustrated embodiment of FIG. 2, user 31 may elect to retrieve a file 52, which may include a computer originated voice message left by another user of network 30.

Files 48-52 may include both analog and digital computer originated messages. In order for user 31 to listen to such messages, a particular file is digitized (if applicable), broken down into a plurality of communication packets 56 and transmitted from server 36 to terminal unit 33 over communication path 54. Each communication packet 56 includes a header 58 and payload 60. Header 58 includes address information regarding server 36 and/or terminal unit 33. Payload 60 includes data which forms a portion of the particular file to be transmitted. Payload 60 may also include trailer and sequence information regarding packet 56.

As each packet 56 arrives at terminal unit 33, the packets enter a buffer 62 where the packet may be temporarily stored, and queued until terminal unit 33 is available for playback. Buffer 62 is a temporary storage area for packets. Its purpose is to act as a holding area in order to accumulate packets before playback begins. This is done in order to reduce the effects of "jitter," which is packet based digital communication line distortion caused by the carrier signal varying from its reference timing positions. Jitter can cause data loss, particularly at high speeds. In a particular embodiment, buffer 62 may include a jitter buffer.

Accordingly, terminal unit 33 may not begin to play the contents of the file to user 31 until buffer 62 reaches a certain predefined capacity of packets. For example, buffer 62 may begin playback after receiving four packets. This is done to allow buffer 62 to compensate for any delay in receiving packets 56 from server 36 and eliminate jitter. For the purposes of this specification, the capacity of the buffer may mean either the total number of packets which may be stored by the buffer, or the minimum number of packets which must be received by the buffer before playback will begin.

In a particular embodiment, buffer 62 is configured to transmit packets to other components of terminal unit 33 for playback every twenty milliseconds. Accordingly, server 36 may be configured to transmit one packet across communication path 54 every twenty milliseconds. If a packet is delayed, etc., buffer 62 can compensate by transmitting packets already queued in buffer 62, and user 31 will seamlessly continue to receive packets as if an error had not occurred.

Figure 3:
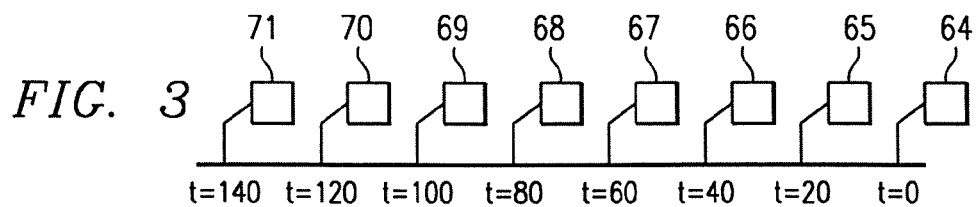
FIG. 3 is a block diagram illustrating the transmission of a plurality of packets over the communication path of FIG. 2.

FIG. 3 illustrates an example of file 48 of FIG. 2, being transmitted across communication path 54, to terminal unit 33. As illustrated in FIG. 3, file 48 is broken down into eight communication packets 64-71. Upon establishing a connection, at time t=0, server 36 transmits packet 64. Successive packets 65-71 are transmitted at a rate of one packet every twenty milliseconds. The rate at which additional packets are transmitted may be varied within the teachings of the present invention.

As discussed above, buffer 62 may be configured to withhold playback until at least four packets are received. Therefore, user 31 will experience a delay of approximately sixty milliseconds, while buffer 62 waits to receive additional packets 65-67. The teachings of the present invention provide a system and method to overcome such a delay.

Figure 4:
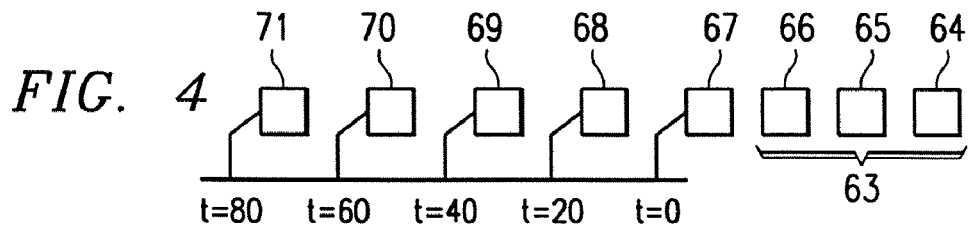
FIG. 4 is a block diagram illustrating the transmission of a plurality of packets over the communication path of FIG. 2, in accordance with one embodiment of the present invention.

FIG. 4 illustrates a method for transmitting file 48, such that user 31 will not experience a delay while buffer 62 waits for additional packets. In the illustrated embodiment of FIG. 4, file 48 is represented by eight communication packets 64-71. Immediately upon establishing a connection with terminal unit 33, server 36 sends an initial burst of packets 63, which includes packets 64-67. Therefore, since buffer 62 begins playback upon receiving four packets, playback will begin immediately upon receipt of packets 64-67, which will arrive approximately simultaneously. Accordingly, the teachings of the present invention speeds up the filling of the jitter buffer and thus, accelerates the start of playing of the prompt.

The speed of communication path 54 (FIG. 2) determines, at least in part, the number of packets which may be included in the initial burst. For example, many systems are configured to transmit and/or playback packets every twenty milliseconds. However, network 30 may be configured to handle data transmission rates exceeding the range of one hundred megabits per second to one gigabit per second. Therefore, network 30 may transmit multiple average sized packets almost simultaneously.

After transmitting the initial burst of packets 64-67, server 36 sends, or transmits additional packets 68-71 at a rate of one packet every twenty milliseconds. Therefore, at time t=20 milliseconds, server 36 transmits packet 68, at t=40 milliseconds, server 36 transmits packet 69, at t=60 milliseconds, server 36 transmits packet 70, and at t=80 milliseconds, server 36 transmits packet 71. Accordingly, buffer 62 receives the initial burst of packets 64-67 simultaneously, and immediately begins playback of file 48. Also, buffer 62 receives an additional packet every twenty milliseconds thereafter. If server 36, terminal unit 33, and/or communications network 20 experience problems that may delay any particular packet 68-71, buffer 62 may seamlessly continue playback while the problem is addressed.

In the illustrated embodiment of FIG. 4, four packets 64-67 are included in the initial burst of packets. It will be recognized that the number of packets in the initial burst may be significantly modified within the teachings of the present invention. The number of packets included in the initial burst may be determined, at least in part, due to the size, performance and/or configuration of buffer 62. Similarly, the number of packets included in the initial burst may be based upon particular characteristics of server 36 and/or communication path 54.

By transmitting an initial burst of packets including a predetermined number of packets (greater than one), the system ensures that buffer 62 will begin with at last the predetermined number of packets. This minimizes the likelihood of jitter buffer starvation during playback.

Four packets 64-67 were selected for inclusion within the initial burst of packets in the embodiment of FIG. 4, based upon the configuration of buffer 62. Many buffers are configured to begin playback upon the receipt of approximately four packets. Also, due to the differing capacity of particular buffers, a designer must be cognizant of the maximum number of packets a buffer is able to store, to avoid overfilling the buffer with packets which may lead to lost packets, degraded voice quality, and unwanted errors in playback.

Within the teachings of the present invention, terminal unit 33 may be configured to identify a situation where it establishes a connection with a server having computer originated voice messages. In a particular embodiment, this may be accomplished during H.323 call setup. During H.323 call setup, network devices (e.g. server 36 and terminal unit 33) exchange capabilities about each other. The exchanged information includes payload type and compression information.

This system may be configured to transmit information about the jitter buffer, for example its capacity, and the minimum number of packets which must be collected before playback may begin. Therefore, during call setup, server 36 may automatically configure the system to communicate operable based upon the total capacity of the buffer, and the minimum number of packets required to begin playback.

Figure 5:
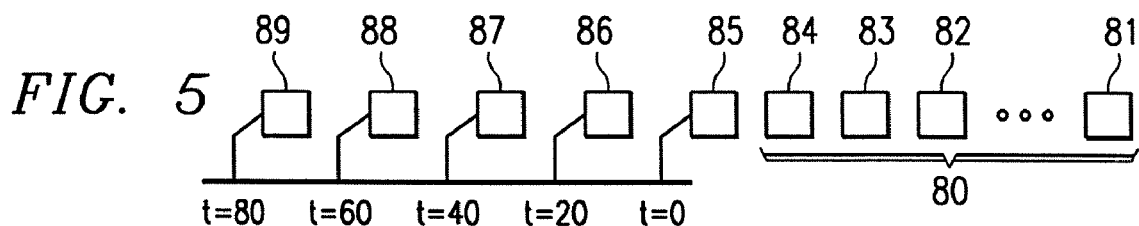
FIG. 5 is a block diagram illustrating the transmission of a plurality of packets over the communication path of FIG. 2, in accordance with another embodiment of the present invention.

FIG. 5 illustrates a communication session between server 36 and terminal unit 33, in accordance with another aspect of the present invention. The initial burst of packets 80 of FIG. 5 includes multiple packets 81-85. Substantially more, or fewer than five packets may be included with an initial burst 80, within the teachings of the present invention. In accordance with one embodiment of the present invention, initial burst 80 may include all of the packets included within a particular file, for example, computer originated audio file 51. Again, the number of packets included in initial burst 80 may take into account the capacity of buffer 62 of terminal unit 33. The number of packets included may also be based upon the minimum number required before playback will begin. Additional packets 86-89 are sent by server 36 at twenty millisecond intervals.

Figure 6:
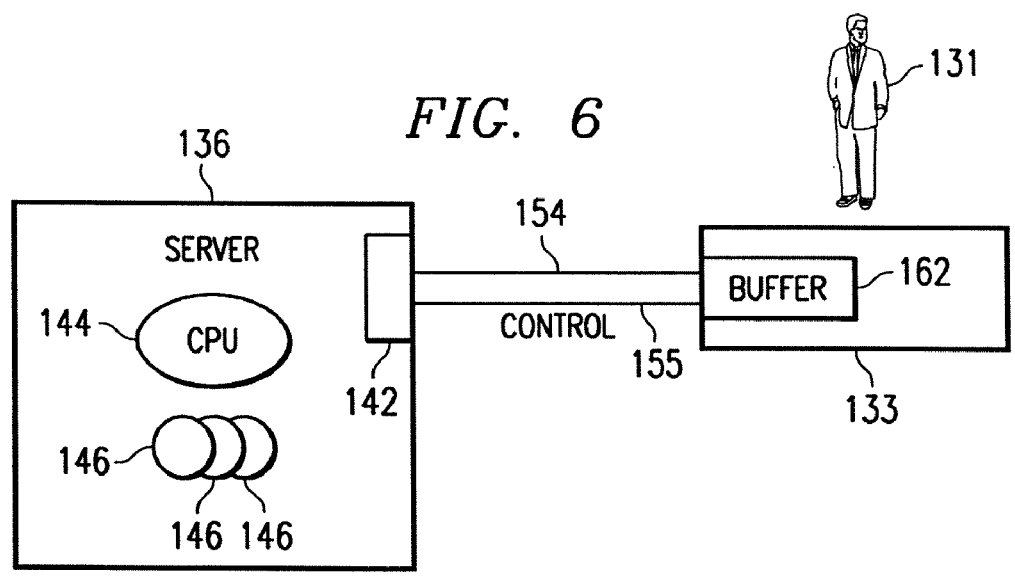
FIG. 6 is a block diagram illustrating a path of communication and a control channel established between the server and one of the terminal units of FIG. 1, in accordance with yet another aspect of the present invention.

FIG. 6 is a block diagram illustrating a communication session between server 136 and terminal unit 133. Server 136 may be configured similarly to server 36 of FIG. 1. Accordingly, server 136 may include a communications module 142, central processing unit 144, and/or one or more databases 146. A communication path 154 is established between server 136 and terminal unit 133. Communication path 154 may include communication links 41 and/or 39 of FIG. 1, and a connection between server 136 and terminal unit 133 may be established over the Internet. Therefore, a direct physical connection may be established between terminal unit 133 and server 136 over communication path 154.

In the illustrated embodiment of FIG. 6, a control channel 155 is established between terminal unit 133 and server 136. In a particular embodiment, control channel 155 may be an "out-of-band" communication path between terminal unit 133 and server 142. Therefore, information may be exchanged between terminal unit 133 and server 136 independent of communications over communication path 154. Control channel 155 may be used to exchange information and control signals regarding the communication session between terminal units 133 and 136.

In the illustrated embodiment, control channel 155 is used to control the operation of buffer 162 of terminal unit 133. For example, control channel 155 may be used to prevent "overplay" of buffer 162. For the purposes of this specification, overplay refers to a situation where buffer 162 unnecessarily continues playback. This situation may occur where a menu of options is being played to user 131 of terminal unit 133. For example, server 136 may transmit a message to buffer 162 which includes the following message: "If you know your party's extension, please dial it at any time, if you would like to reach a company directory, please press one, if you would like to reach the office of accounts payable, please press two, if you would like to reach the office of accounts receivable, please press three, etc." If user 131 dials a particular extension during playback of this message, the balance of the message does not need to continue playback. However, even though server 136 discontinues transmitting packets after detecting this action, buffer 162 will continue to play packets from its queue, until buffer 162 is depleted of all packets. User 131 will detect this as unnecessary overplay.

In response to user's 131 selection of a particular extension, server 136 may respond by transmitting another file, which includes another message for user 131. However, after server 136 sends this file, buffer 162 will not begin to play the new message in the new file until all leftover packets from the original message are played. The teachings of the present invention provide a system and method to overcome overplay of unnecessary packets.

In a particular embodiment of the present invention, server 136 may communicate with buffer 162 over control channel 155. Such communications may include a command by server 136 for buffer 162 to pause, discontinue playback, and/or discard all packets remaining in the queue of buffer 162. Accordingly, overplay is reduced and/or eliminated. Therefore, user 131 of terminal unit 133 may select to pause playback of a file (e.g. a voicemail message), or end playback altogether. Also, if user 131 makes another selection during playback, server 136 may instruct buffer 162 to discard the unnecessary packets. Control channel 155 allows server 136 to exercise control over buffer 162 to pause playback, stop playback, and/or discard the contents of the buffer without user 131 experiencing a "sluggish" response due to overplay.

FIG. 7 is a block diagram illustrating a method for transmitting a computer originated audio file between a server and a terminal unit. The method begins at step 100 where a server receives a request to transmit a file. In a particular embodiment, the request is a result of establishing a session between the terminal unit and the server. In another embodiment, the request is transmitted from a terminal unit to a server. Accordingly, a path of communication exists between the server and the terminal unit. As previously described, the VoIP may be used to accomplish communication between the server and the terminal unit. Therefore, the path of communication between the server and the terminal unit may include the Internet.

At step 102, the server transmits an initial burst of packets at time t=0. The time t=0 indicates the starting point for transmission of the file between the server and the terminal unit. The initial burst of packets are transmitted from the server to the terminal unit over the communication path. Since VoIP technology may be used for this transmission, it will be understood that each packet need not travel the same physical path between the server and the terminal unit. Accordingly, for the purposes of this specification, the communication path between the server and the terminal unit is dynamic, and may change for each of one or more packets. The communication path traveled by a particular packet may be determined, at least in part, due to such factors as speed of transmission, existing network traffic, and the physical location of each of the server and the terminal unit.

The initial burst of packets may include any number of packets greater than one. By transmitting more than one packet at t=0, or the beginning of the file transmission, the terminal unit will receive packets more rapidly and delays in playback may be avoided. The number of packets included in the initial burst of packets may be based at least in part upon an actual, estimated, or "guesstimated" capacity of a buffer associated with the terminal unit.

As previously discussed, the initial burst of packets may include the entire file to be transmitted, depending upon the size of the file and the capacity of the buffer. Therefore, at step 104, the server determines whether the file transmission is now complete. If the file transmission is complete, the method ends.

If the file transmission is not complete, at step 106, additional packets are transmitted by the server at predetermined time intervals. The time interval, or rate at which additional packets are transmitted, may be based at least in part upon industry standards and protocols. The rate of transmission may also be determined, at least in part, based upon characteristics of the server, path of communication, and/or the terminal unit, including the capacity of a buffer associated with the terminal unit.

Returning to step 104, the server determines whether or not the file transmission is complete. If the file transmission is complete at this point, the method ends. If the file transmission is not complete, another packet is transmitted at the next predetermined time interval. The steps of determining whether the file transmission is complete may be a passive step, in accordance with the teachings of the present invention. In other words, if no indication is received that the file transmission is complete, step 106 will continue until such notification is received.

FIG. 8 illustrates a method for transmitting a file from a server to a terminal unit, in accordance with another embodiment of the present invention. The method begins at step 200 where a connection between the server and the terminal unit is established. This step includes verifying that a path of communication exists between the server and the client. As previously discussed, the path of communication may be dynamic, such that individual packets transmitted from the server to the terminal unit may take different physical paths, and be handled by different network components.

At step 202, a control channel is established between the server and the terminal unit. In a particular embodiment, the control channel may be "out of band." For the purposes of this specification "out of band" means that signaling and control information transmitted between the server and the terminal unit over the control channel is separated from the path of communication of the packets. The control channel allows an independent path of communication such that signals and control information may be transmitted independent of the packets, allowing for speed and priority which may not be available using the same communication path as the packets.

At step 204, the server collects buffer characteristics regarding a buffer associated with the terminal unit. The buffer characteristics may include information including capacity (e.g., the number of packets the buffer can maintain at one time), acceptable transmission speeds, and/or other information regarding standards and protocols of the telecommunications industry.

Next, at step 206, an initial burst of packets is transmitted from the server to the terminal unit. The number of packets included in the initial burst of packets may be based, at least in part, upon the information and characteristics collected at step 204.

At step 208, the server monitors the control channel for a command from the terminal unit. The commands may include menu selections, and/or other control information and signals. The control information may include dual tone multi-frequency (DTMF) dialing, or key depressions.

At step 210, additional packets are transmitted between the server and the terminal unit at a predetermined transmission rate. The transmission rate may be determined, at least in part, based upon the information and characteristics collected at step 204. At step 212, the server determines whether a command has been received over the control channel. If no command is received, the method returns to step 210, and an additional packet is transmitted from the server to the terminal unit. If a command is received, the server executes the command at step 214. Executing the command may include responding with a command to the terminal unit to stop playback from the buffer. If the command received by the server over the control channel requires another file to be sent to the terminal unit, the server may also respond by transmitting a command to the terminal unit instructing the terminal unit to "flush" the contents of the buffer. By flushing the contents of the buffer, the terminal unit may begin playback of the second file received from the server, immediately upon receipt, without the delay of playing unnecessary packets that remain in the queue of the buffer.

In a particular embodiment, the features and functionality of the present invention may be embodied in hardware, software, and/or logical instructions encoded in a computer readable medium(s).

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method, comprising:
   receiving, at a server, a request to transmit a computer originated audio file to a terminal unit, the file including a plurality of packets;
   transmitting an initial burst of packets to the terminal unit, the initial burst of packets including a number of the plurality of packets,
      wherein the number of packets included is at least two and is determined based at least on communication properties of at least on of:
         a communication path between the server and the terminal unit, the terminal unit, and
         the server; and
   transmitting additional packets of the plurality of packets at a predetermined rate, until each of the plurality of packets has been sent to the terminal unit;
      wherein the path of communication includes a voice over internet protocol (VoIP) path of communication.

2. The method of claim 1, wherein the rate at which the additional packets of the plurality of packets are sent to the terminal unit comprises approximately one packet every twenty milliseconds.

3. The method of claim 1, further comprising receiving information indicating a capacity of a buffer of the terminal unit.

4. The method of claim 3, wherein the number of the plurality of packets included in the initial burst of packets is independent of the capacity of the buffer of the terminal unit.

5. The method of claim 3, wherein the number of the plurality of packets included in the initial burst of packets is based upon the capacity of the buffer of the terminal unit.

6. The method of claim 5, wherein the initial burst of packets includes a number of the plurality of packets approximately equal to the capacity of the buffer of the terminal unit.

7. A system, comprising:
   a communications module operable to communicate with a terminal unit;
   a storage device operable to store at least one computer originated audio file;
   a processor operable to separate the file into a plurality of packets;
   the communications module being further operable to:
      send an initial burst of packets to the terminal unit,
         wherein the initial burst of packets includes a number of the plurality of packets,
         wherein the number of packets included is at least two and is determined based at least on communication properties of at least on of:
            a communication path between the server and the terminal unit,
            the terminal unit, and
            the server, and send additional packets of the plurality of packets at a predetermined rate, until each of the plurality of packets has been sent to the terminal unit; and wherein the communications module is further operable to communicate using voice over internet protocol (VoIP).

8. The system of claim 7, wherein the rate at which the additional packets of the plurality of packets are sent to the terminal unit comprises approximately one packet every twenty milliseconds.

9. The system of claim 7, wherein the communications module is further operable to receive information indicating a capacity of a buffer of the terminal unit.

10. The system of claim 9, wherein the number of the plurality of packets included in the initial burst of packets is independent of the capacity of the buffer of the terminal unit.

11. The system of claim 9, wherein the number of the plurality of packets included in the initial burst of packets is based upon the capacity of the buffer of the terminal unit.

12. The system of claim 11, wherein the initial burst of packets includes a number of the plurality of packets approximately equal to the capacity of the buffer of the terminal unit.

13. A system for transmitting a file from a server to a terminal unit, comprising:

a non-transitory computer readable storage medium storing logic operable, when executed by a processor, to:

receive, at a server, a request to transmit a computer originated audio file to a terminal unit, the file including a plurality of packets;

transmit an initial burst of packets to the terminal unit, the initial burst of packets including a number of the plurality of packets, wherein the number of packets included is at least two and is determined based at least on communication properties of at least on of:

a communication path between the server and the terminal unit, the terminal unit, and the server; and transmit additional packets of the plurality of packets at a predetermined rate, until each of the plurality of packets has been sent to the terminal unit;

wherein the path of communication includes a voice over internet protocol (VoIP) path of communication.

14. The system of claim 13, wherein the rate at which the additional packets of the plurality of packets are sent to the terminal unit comprises approximately one packet every twenty milliseconds.

15. The system of claim 13, wherein the logic is further operable to receive information indicating a capacity of a buffer of the terminal unit.

16. The system of claim 15, wherein the number of the plurality of packets included in the initial burst of packets is independent of the capacity of the buffer of the terminal unit.

17. The system of claim 15, wherein the number of the plurality of packets included in the initial burst of packets is based upon the capacity of the buffer of the terminal unit.

18. The system of claim 17, wherein, the initial burst of packets includes a number of the plurality of packets approximately equal to the capacity of the buffer of the terminal unit.

19. A system, comprising:

server means for receiving a request to transmit a computer originated audio file to a terminal unit, the file including a plurality of packets;

processor means for transmitting an initial burst of packets to the terminal unit, wherein the number of packets included is at least two and is determined based at least on communication properties of at least on of:

a communication path between the server and the terminal unit, the terminal unit, and the server;

processor means for transmitting additional packets of the plurality of packets at a predetermined rate, until each of the plurality of packets has been sent to the terminal unit; and further comprising means for communicating with the terminal unit using VoIP.

20. The system of claim 19, further comprising processor means for receiving information indicating a capacity of a buffer associated with the terminal unit.

21. The system of claim 20, wherein the number of the plurality of packets included in the initial burst of packets is independent of the capacity of the buffer of the terminal unit.

* * * * *